UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING ERYTHRENE.

1,036,876.  Specification of Letters Patent.  Patented Aug. 27, 1912.

No Drawing.   Application filed November 21, 1911. Serial No. 661,535.

*To all whom it may concern:*

Be it known that we, GEORG MERLING and HUGO KÖHLER, doctors of philosophy, chemists, citizens of the German Empire, residing at Elberfeld, Germany, have invented new and useful Improvements in Processes of Producing Erythrene, of which the following is a specification.

We have found that erythrene may be obtained from alpha-methylallyldimethylamin by converting the latter (obtainable from alpha-methyltrimethylenedimethylammonium hydroxid) into the completely alkylated alpha-methylallyltrimethylammonium base and decomposing this base into erythrene, trimethylamin and water.

The following formulæ illustrate the process which probably takes place:

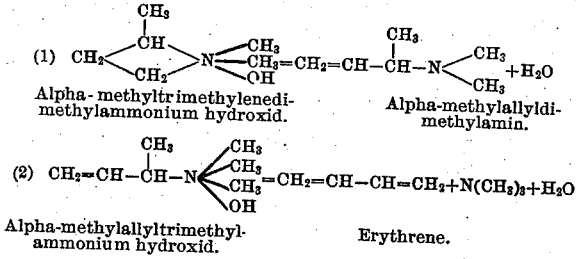

*First phase of reaction, production of alpha-methylallyltrimethylammonium base.*—By treatment with the theoretical amount of freshly prepared silver oxid, alpha-methyltrimethylene-dimethylammonium iodid in aqueous solution is quickly converted into the corresponding ammonium hydroxid and iodid of silver. The filtered solution is distilled, whereupon the decomposition of the ammonium hydroxid into water and alpha-methylallyldimethylamin

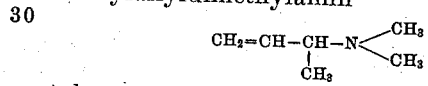

takes place. The latter distils over with steam as an oil scarcely soluble in water. The distillate is neutralized with hydrochloric acid or with tartaric acid and then concentrated. The base is liberated by caustic potash, dried over caustic potash and purified by distillation. In simpler and quicker manner the base can be obtained from the alpha-methyl-trimethylene-dimethylammonium idodid, chlorid, or bromid by heating with an excess of pulverized caustic potash in an oil bath with or without the addition of a small quantity of water and alcohol.

Alpha-methylallyldimethylamin is a thin colorless oil with a coniine like odor, which boils under atmospheric pressure at from 90–93° C. and decolorizes permanganate in dilute sulfuric acid solution. The base combines with methyl chlorid to alpha-methylallyl-trimethylammonium chlorid, which is easily soluble in water and alcohol.

*Second phase of reaction, decomposition into erythrene.*—Alpha-methylallyltrimethyl-ammonium chlorid is converted into the ammonium hydroxid in the same manner as described above. This product is decomposed by distilling the aqueous solution, or the ammonium halogenid by distilling the aqueous solution, or the ammonium halogenid is directly heated with pulverized caustic potash, calcium oxid or barythydrate under suitable addition of a small quantity of alcohol or water, whereby erythrene is formed with theoretical yield. It is conducted through dilute sulfuric acid, dried over calcium chlorid and condensed by cooling.

We claim:—

The process of producing erythrene which comprises completely alkylating alpha-methylallyl-dimethylamin, and decomposing the resulting quaternary ammonium compounds, substantially as described.

In testimony whereof we have hereunto set our hands in the presence of two subscribing witnesses.

GEORG MERLING.  [L. S.]
HUGO KÖHLER.   [L. S.]

Witnesses:
 HELEN NUFER.
 ALBERT NUFER.